Feb. 10, 1953 R. S. JOHNSON 2,627,874
HYDRAULICALLY OPERATED REINFORCED COLLAPSIBLE VALVE
Filed Sept. 20, 1945
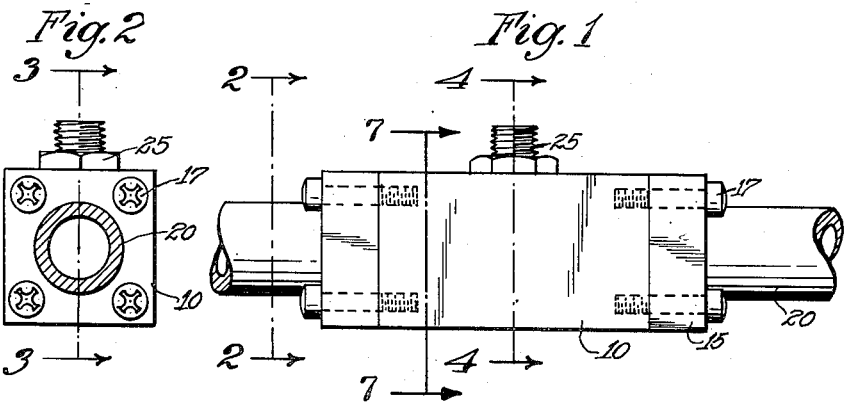
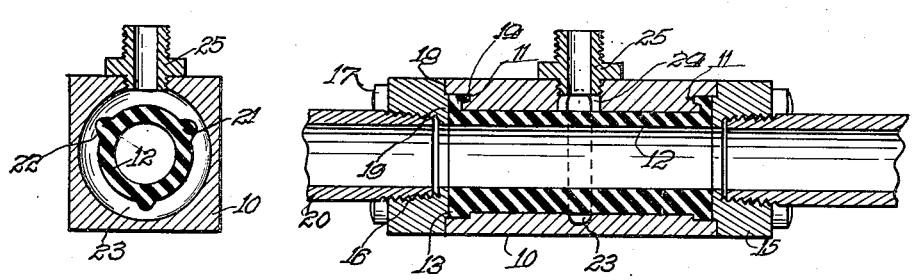
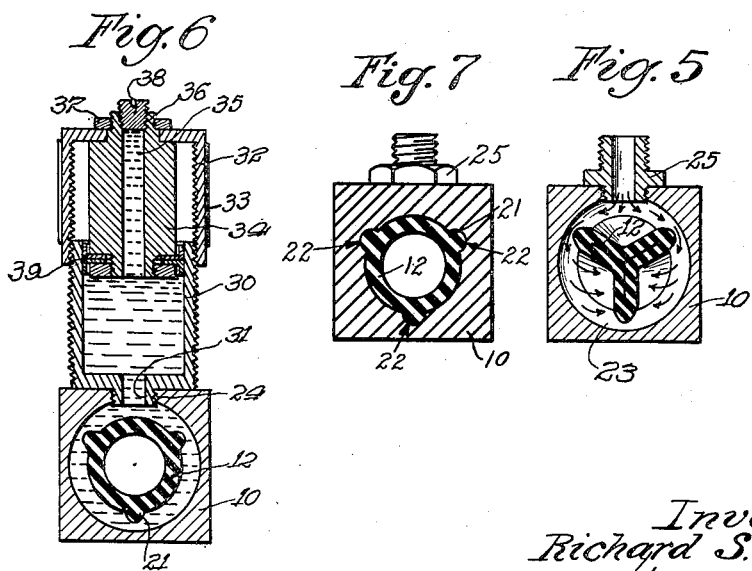
Inventor
Richard S. Johnson
by Henry Hech
Attorney.

Patented Feb. 10, 1953

2,627,874

UNITED STATES PATENT OFFICE 2,627,874

HYDRAULICALLY OPERATED REINFORCED COLLAPSIBLE VALVE

Richard S. Johnson, Racine, Wis.

Application September 20, 1945, Serial No. 617,517

3 Claims. (Cl. 137—688)

The invention relates to hydraulic valves and more particularly to valves having a lining of elastic material to resist the action of chemicals and which lining may be compressed to close the valve.

It is an object of the invention to provide a valve which has hydraulic means for actuating the valve whereby such valve may be remotely controlled.

A further object constitutes the provision of means for exerting pressure on the valve lining which pressure is exerted uniformly around the circumference of the lining.

Another object constitutes the provision of a central groove in the valve housing so that uniform pressure is exerted circumferentially by reason of the groove.

A still further object constitutes the provision of a valve wherein the lining when actuated is not permanently distorted by reason of contact with the actuating means.

Another object aims at reinforcing the lining at spaced intervals and subjecting only the weak portions of the lining to closing pressure whereby a more effective closing is attained.

A still further object constitutes the provision of a valve wherein the lining is subjected to pressure on both sides thereby obviating permanent distortion of the lining.

It is a still further object of the invention to provide the valve housing with longitudinal grooves in which the reinforcing ribs are received, the life of the lining being prolonged since the ribs are not subjected to pressure and the intermediated portions being subjected to substantially equalized strains during closing operation. Thus, the seating of the ribs in the grooves prevent rupture or distortion of the liner due to internal and external pressure.

With these and other objects in view which will become apparent from a perusal of the invention the latter comprises the means described in the following specification, particularly pointed out in the claims forming a part thereof, and illustrated in the accompanying drawing, in which Fig. 1 is a side view of a valve constructed in accordance with my invention.

Fig. 2 is a section on the line 2—2 of Fig. 1.

Fig. 3 is a section on the line 3—3 of Fig. 2.

Fig. 4 is a section on the line 4—4 of Fig. 1.

Fig. 5 is a view similar to Fig. 4 with the valve in closed position,

Fig. 6 is a cross section through a modified valve, and

Figure 7 is a section on the line 7—7 of Fig. 1.

Referring to the several views of the drawing, the valve comprises a body portion 10, which has a square cross section but may be round or have any other desired cross section.

The ends of the body portion are counterbored to provide an undercut groove 11.

The interior of the body portion has a lining 12 of rubber or other resilient material which is formed at the ends with a flange 13 provided on the inner end with a rib 14 adapted to be received within the groove.

End pieces 15 having the same configuration as the body portion 10 and provided with a circular threaded bore 16 are placed against the end faces of the valve body and secured thereto by a plurality of screws 17.

The inner face of each end piece is rabbeted as at 18 whereby its center portion 19 engages the flange 13 and firmly secures the rib 14 in the groove 11.

A pipe 20 is threadedly secured to each end piece.

The lining 12 is formed with longitudinal reinforcing ribs 21 spaced equi-distantly along its circumference and these ribs are seated in longitudinal grooves 22 provided in the inner face of the body portion 10.

The body portion is also provided with a circumferential groove 23 opening at the top into a vertical bore 24 which is threaded to receive the threaded end of a nipple 25 to which a hose (not shown) may be attached leading to a source of hydraulic pressure and conducting the pressure medium to the groove 23, so that the lining 12 may be collapsed and the valve closed, as shown in Fig. 5.

Attention is called to the fact that no mechanical part or metals (except the housing) contacts the lining to collapse the same.

The pressure for collapsing the lining is distributed around the longitudinal center of the lining.

There is no permanent distortion since the groove 23 is small and the lining is subjected to pressure on both sides.

Furthermore only the portions between the reinforcing ribs 21 are extensively deformed by the collapsing pressure, so that the resumption of normal open position upon cessation of pressure is facilitated.

In Fig. 6 a hydraulic pressure means is shown in connection with the valve.

Here a cylinder 30 is provided formed at the bottom with a nipple 31 which is threadedly received in the opening 24.

A hollow control knob 32 formed with flutings 33 has secured thereto a piston 34 which has a longitudinal bore 35 and projects with a reduced portion 36 through a central aperture in the knob which is formed with threads engaging the outer threads of the cylinder.

A nut 37 secures the piston to the knob. A plug 38 closes the bore of the piston which is provided with a packing 39 to prevent leakage.

Upon turning of the knob the piston is lowered or raised depending on the direction of rotation. Upon descent of the piston the fluid collapses the lining as shown in Fig. 5.

While the drawing shows one embodiment of the valve numerous changes and alterations may be made without departing from the spirit of the invention.

I, therefore, do not limit myself to the details of construction and arrangement of parts, as shown, but wish to include all changes and modifications constituting departures within the scope of the invention as defined in the appended claims.

I claim:

1. A valve comprising a rigid body portion having a bore of uniform diameter and a plurality of circumferentially spaced longitudinal grooves in the inner wall of said bore, a tubular valve lining of flexible liquid-impervious material in said bore and being sealed at its ends with respect to the body portion, said lining having a like plurality of external longitudinal ribs each fitted into one of said grooves, and a passage leading interiorly of said bore and extending around said lining to communicate hydraulic pressure to the exterior surface of said lining for compressing the same to close off passage of fluid therethrough.

2. A valve comprising a body having a bore therethrough and of fluid-impervious material of sufficient rigidity to withstand a predetermined internal fluid pressure, an elastic tube-like valve lining of fluid-impervious material fitted into said bore and sealed at its opposite ends with respect to the body to define a fluid chamber between the inner wall of the bore and the outer wall of said lining, the latter having a plurality of circumferentially-spaced longitudinally extending ribs on its outer surface and each fitted closely into a longitudinally extending groove formed in the inner wall of said bore, said body having a fluid-pressure passage leading into said chamber and extending about said lining for the purpose of transmitting fluid pressure to the areas of the lining between said ribs to collapse the lining to close the latter against passage of fluid therethrough responsive to fluid pressure of less than said predetermined value in said chamber.

3. In a valve, an elongated, elastic fluid-impervious tube, normally elastically biased into open tubular condition, and having at least three integral, circumferential, and equally spaced longitudinal ribs comprising thickened wall sections defining relatively non-compressible and non-deformable areas in said tube with relatively collapsible areas intervening therebetween, a rigid sleeve fitting around said tube and adapted at its opposite ends for connection with a fluid flow line communicating into said tube, means providing a fluid seal between corresponding ends of said tube and sleeve at the respective opposite ends thereof, said sleeve having a circumferential, internal channel near its mid-portion, a fluid passage through said sleeve communicating to the interior thereof into said channel and to all of said intervening areas for transmission of fluid pressure to the latter to collapse the tube in the said intervening areas between said ribs and thereby restrict fluid flow through the interior thereof, said sleeve having longitudinally-extending grooves interiorly thereof and each fitting with one of said ribs to anchor the tube in the sleeve.

RICHARD S. JOHNSON.

REFERENCES CITED

The following references are of record in the file of this patent:

UNITED STATES PATENTS

| Number | Name | Date |
|---|---|---|
| 177,478 | Curtis | May 16, 1876 |
| 1,586,923 | Townsend | June 1, 1926 |
| 1,873,138 | Mitchell | Aug. 23, 1932 |
| 1,907,025 | Williams | May 2, 1933 |
| 1,977,504 | Brown | Oct. 16, 1934 |
| 2,291,912 | Meyers | Aug. 4, 1942 |
| 2,305,840 | Brown | Dec. 22, 1942 |
| 2,352,642 | Langdon | July 4, 1944 |
| 2,467,150 | Nordell | Apr. 12, 1949 |

FOREIGN PATENTS

| Number | Country | Date |
|---|---|---|
| 972 | Great Britain | of 1865 |
| 504,449 | Germany | of 1920 |